(12) United States Patent
Cao

(10) Patent No.: US 9,421,871 B2
(45) Date of Patent: Aug. 23, 2016

(54) MOTOR CONTROLLER

(71) Applicant: DENSO CORPORATION, Kariya, Aichi-pref. (JP)

(72) Inventor: Junmin Cao, Kariya (JP)

(73) Assignee: DENSO CORPORATION, Kariya (JP)

(*) Notice: Subject to any disclaimer, the term of this patent is extended or adjusted under 35 U.S.C. 154(b) by 0 days.

(21) Appl. No.: 14/848,416

(22) Filed: Sep. 9, 2015

(65) Prior Publication Data

US 2016/0137067 A1 May 19, 2016

(30) Foreign Application Priority Data

Nov. 13, 2014 (JP) ................................. 2014-230774

(51) Int. Cl.
*G06F 17/10* (2006.01)
*B60L 7/18* (2006.01)
*B60W 10/08* (2006.01)
*B60W 10/18* (2012.01)
(Continued)

(52) U.S. Cl.
CPC *B60L 7/18* (2013.01); *B60W 10/08* (2013.01); *B60W 10/18* (2013.01); *B60W 20/00* (2013.01); *B60W 30/09* (2013.01); *B60W 2540/10* (2013.01); *B60W 2550/302* (2013.01); *B60W 2550/308* (2013.01); *B60W 2710/083* (2013.01); *B60W 2710/18* (2013.01); *Y10S 903/93* (2013.01)

(58) Field of Classification Search
CPC ............ B60W 30/16; B60W 2540/10; B60W 2550/308; B60W 2710/0666; B60T 2201/022; B62D 5/0463; B62D 6/003; B62D 6/008; B62D 7/159; G01S 17/936

USPC ................... 701/70, 96, 301, 300, 41, 71, 94
See application file for complete search history.

(56) References Cited

U.S. PATENT DOCUMENTS

| 5,215,159 A * | 6/1993 | Nishida .............. B60K 31/0008 180/169 |
| 6,370,470 B1 * | 4/2002 | Yamamura ......... B60K 31/0008 180/170 |
| 2005/0065687 A1 * | 3/2005 | Hijikata ................ G01S 17/936 701/41 |

(Continued)

FOREIGN PATENT DOCUMENTS

| JP | 2007-129827 A | 5/2007 |
| JP | 2007-132293 A | 5/2007 |

(Continued)

*Primary Examiner* — Redhwan k Mawari
(74) *Attorney, Agent, or Firm* — Posz Law Group, PLC

(57) ABSTRACT

A motor controller includes an inter-vehicle sensor detecting an inter-vehicle distance between an own vehicle and a front vehicle, a speed sensor detecting a speed difference between a speed of the own vehicle and a speed of the front vehicle, an accelerator sensor detecting an accelerator pressing quantity, and a control portion controlling a regeneration torque of the motor based on the inter-vehicle distance, the speed difference, and the accelerator pressing quantity. When the control portion determines that the accelerator pressing quantity is less than or equal to a predetermined pressing quantity, the control portion determines that a speed-reduction request is generated. When the control portion determines that the inter-vehicle distance is no more than a first predetermined distance and when the own vehicle is in an approaching state, the control portion increases the regeneration torque of the motor, so as to generate a regeneration braking force.

7 Claims, 5 Drawing Sheets

(51) Int. Cl.
*B60W 20/00* (2016.01)
*B60W 30/09* (2012.01)

(56) References Cited

U.S. PATENT DOCUMENTS

| | | | |
|---|---|---|---|
| 2005/0090984 A1* | 4/2005 | Kobayashi | B60K 31/0008 701/301 |
| 2009/0088925 A1* | 4/2009 | Sugawara | B60W 30/12 701/41 |
| 2009/0164080 A1* | 6/2009 | Kurata | B60K 31/0008 701/70 |
| 2009/0164082 A1* | 6/2009 | Kobayashi | B60K 31/0008 701/94 |
| 2010/0045482 A1* | 2/2010 | Strauss | G08G 1/163 340/903 |
| 2010/0094509 A1* | 4/2010 | Luke | B60W 40/02 701/45 |
| 2011/0066342 A1* | 3/2011 | Ozaki | B60T 7/042 701/70 |
| 2011/0245992 A1* | 10/2011 | Stahlin | B60W 50/085 701/1 |
| 2012/0035825 A1* | 2/2012 | Morita | B60T 7/22 701/70 |
| 2015/0291163 A1* | 10/2015 | Kim | B60W 30/12 701/96 |

FOREIGN PATENT DOCUMENTS

| | | |
|---|---|---|
| JP | 2008-125329 A | 5/2008 |
| JP | 2012-008933 A | 1/2012 |

* cited by examiner

MOTOR CONTROLLER

CROSS REFERENCE TO RELATED APPLICATION

This application is based on Japanese Patent Application No. 2014-230774 filed on Nov. 13, 2014, the disclosure of which is incorporated herein by reference.

TECHNICAL FIELD

The present disclosure relates to a motor controller which controls a motor mounted to a vehicle.

BACKGROUND

JP 2007-129827A discloses an intelligent brake assist system generating a regeneration braking force by utilizing a motor in a case where a vehicle is operating in an area necessary to use a brake assist operation.

SUMMARY

In the intelligent brake assist system, the regeneration braking force is generated in an emergency avoidance necessary to execute the brake assist operation.

The present disclosure is made in view of the above matters, and it is an object of the present disclosure to provide a motor controller which can suppress an own vehicle from approaching a front vehicle according to a speed-reduction request of a user and can efficiently generate an electric power.

According to an aspect of the present disclosure, the motor controller controls a motor mounted to a vehicle. The motor controller includes an inter-vehicle sensor, a speed sensor, an accelerator sensor, and a control portion.

The inter-vehicle sensor detects an inter-vehicle distance between an own vehicle and a front vehicle that is travelling in front of the own vehicle.

The speed sensor detects a speed difference between a speed of the own vehicle and a speed of the front vehicle.

The accelerator sensor detects an accelerator pressing quantity generated by a user driving the own vehicle.

The control portion controls a regeneration torque of the motor based on the inter-vehicle distance, the speed difference, and the accelerator pressing quantity.

When the control portion determines that the accelerator pressing quantity is less than or equal to a predetermined pressing quantity, the control portion determines that a speed-reduction request is generated by the user. When the control portion determines that the inter-vehicle distance is no more than a first predetermined distance and when the own vehicle is in an approaching state where the speed difference is greater than a predetermined speed, the control portion increases the regeneration torque of the motor to be greater than the regeneration torque of when the inter-vehicle distance is greater than the first predetermined distance or when the own vehicle is in a non-approaching state where the speed difference is no more than the predetermined speed, so as to generate a regeneration braking force.

Thus, an approaching of the own vehicle toward the front vehicle can be suppressed according to the speed-reduction request of the user, and an electric-power generation can be efficiently executed according to the regeneration braking force generated by increasing the regeneration torque.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
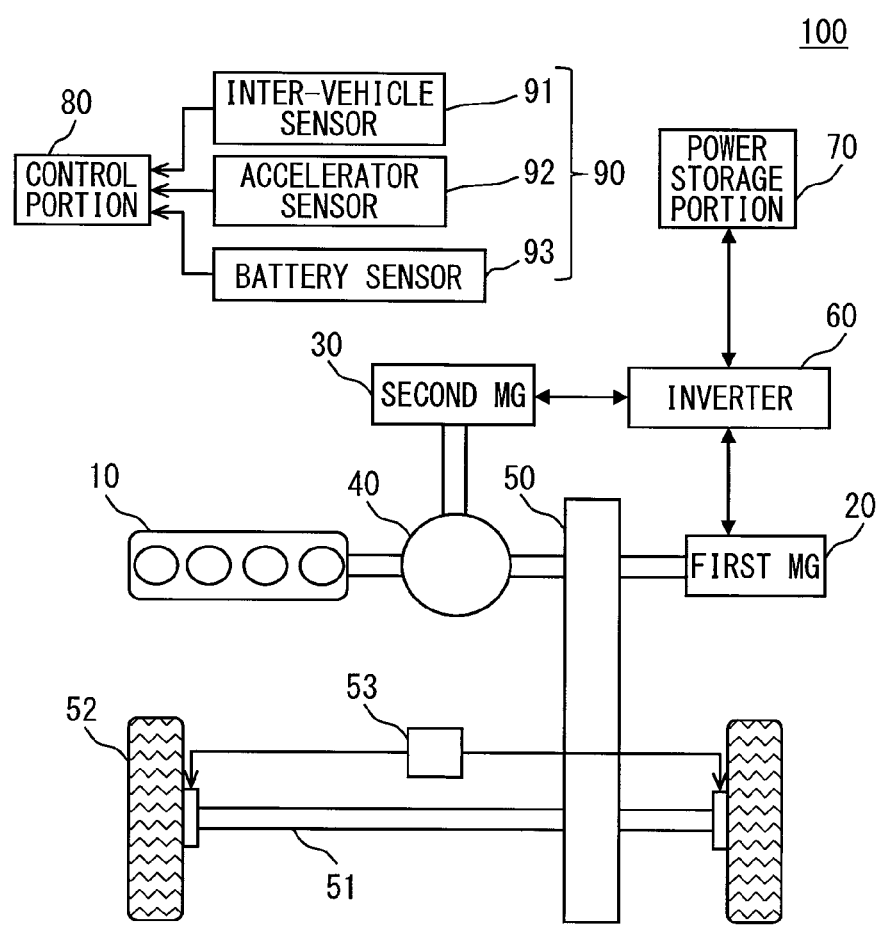
FIG. 1 is a block diagram showing an outline of a hybrid vehicle.

Embodiments of the present disclosure will be described hereafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

Hereafter, referring to drawings, a motor controller applied to a hybrid vehicle 100 according to an embodiment will be described.

First Embodiment

Referring to FIGS. 1 to 7, the hybrid vehicle 100 will be detailed. The motor controller includes a control portion 80 and a sensing portion 90.

As shown in FIG. 1, the hybrid vehicle 100 includes an engine 10, a first motor generator 20 and a second motor generator 30. The engine 10 and the first motor generator 20 function as a motive power source, and the first motor generator 20 and the second motor generator 30 function as a power generating source. The hybrid vehicle 100 further includes a power distribution mechanism 40 distributing power to a vehicle travelling and an electric-power generation. The engine 10 generates a motive power by combusting a fuel, and the first motor generator 20 generates the motive power by rotating an output shaft according to an electric power. The first motor generator 20 generates the electric power when the output shaft is rotated by a rotational energy of a wheel, and the second motor generator 30 generates the electric power when the output shaft is rotated by the motive power of the engine 10.

The hybrid vehicle 100 further includes a speed reducer 50, a drive shaft 51, a drive wheel 52, a hydraulic brake 53, an inverter 60, a power storage portion 70, the control portion 80, and the sensing portion 90. The power distribution mechanism 40 is connected to the speed reducer 50, and the speed reducer 50 is connected to the drive wheel 52 through the drive shaft 51. The motive power distributed to the speed reducer 50 by the power distribution mechanism 40 is transmitted to the drive wheel 52 through the drive shaft 51, and then the hybrid vehicle 100 is driven to travel. The power storage portion 70 is electrically connected with the first motor generator 20 and the second motor generator 30 through the inverter 60. The electric power supplied from the power storage portion 70 is supplied to the first motor generator 20 and the second motor generator 30 through the inverter 60, and then the first motor generator 20 and the second motor generator 30 are rotated. Conversely, the electric power generated by the first motor generator 20 and the second motor generator 30 is supplied to the power storage portion 70 through the inverter 60, and then the power storage portion 70 is electric charged. The inverter 60 is controlled by the control portion 80. The control portion 80 controls the first motor generator 20 and the second motor generator 30 to generate the motive power or generate the electric power. A deceleration of a vehicle speed is controlled according to a braking force of the hydraulic brake 53 and a regeneration-braking force of the first motor generator 20.

The engine 10 includes a cylinder, a piston, an injector, a plug, and a crank shaft. The cylinder and the piston constitute a combustion chamber, and a spray of a fuel is injected by the injector into the combustion chamber. The plug generates a spark in the combustion chamber. When the spray of the fuel is injected into the combustion chamber, the spark is generated, and then the fuel is combusted in the combustion chamber. A volume expansion and volume compression of a gas in the combustion chamber generated according to a combustion of the fuel, an intake gas of the combustion chamber, and an exhaust gas of the combustion chamber controls the piston to move reciprocally. In this case, a reciprocating motion of the piston is converted to a rotational motion by the crack shaft. The rotational motion is transmitted to the power distribution mechanism 40 as the power. The crank shaft is linked to a planetary carrier 42 of the power distribution mechanism 40, and the planetary carrier 42 is rotated by a rotation of the crank shaft. When the engine 10 is not started, the crank shaft is cranked by a rotation of the planetary carrier 42.

The first motor generator 20 has a function generating the motive power, and both the first motor generator 20 and the second motor generator 30 have a function generating the electric power. Both the first motor generator 20 and the second motor generator 30 have the output shaft, a rotor fastened to the output shaft, and a stator provided around the rotor. The rotor includes a permanent magnet, and the stator includes a fixing member wound by plural stator coils. According to the present embodiment, the fixing member may be made of iron. Since the inverter 60 controls a current to flow through the stator coils of the first motor generator 20 so as to generate a rotational torque on the rotor of the first motor generator 20, the output shaft of the first motor generator 20 rotates together with the rotor, and the motive power is transmitted to the power distribution mechanism 40. When the output shaft of the first motor generator 20 rotates together with the rotor of the first motor generator 20 by the rotational energy of the drive wheel 52, a magnetic flux passing through the stator of the first motor generator 20 varies in time according to a rotation of the rotor, and a current flows through the plural stator coils of the first motor generator 20. Thus, the first motor generator 20 executes the electric-power generation. When the output shaft of the second motor generator 30 rotates together with the rotor of the second motor generator 30 by the motive power of the engine 10, the magnetic flux passing through the stator of the second motor generator 30 varies in time according to the rotation of the motor, and the current flows through the plural stator coils of the second motor generator 30. Thus, the second motor generator 30 executes the electric-power generation. The current generated according to the electric-power generation is supplied to the power storage portion 70 through the inverter 60, and the power storage portion 70 is electric charged. According to the present embodiment, the first motor generator 20 is referred to as a first MG 20, and the second motor generator 30 is referred to as a second MG 30.

Figure 2:
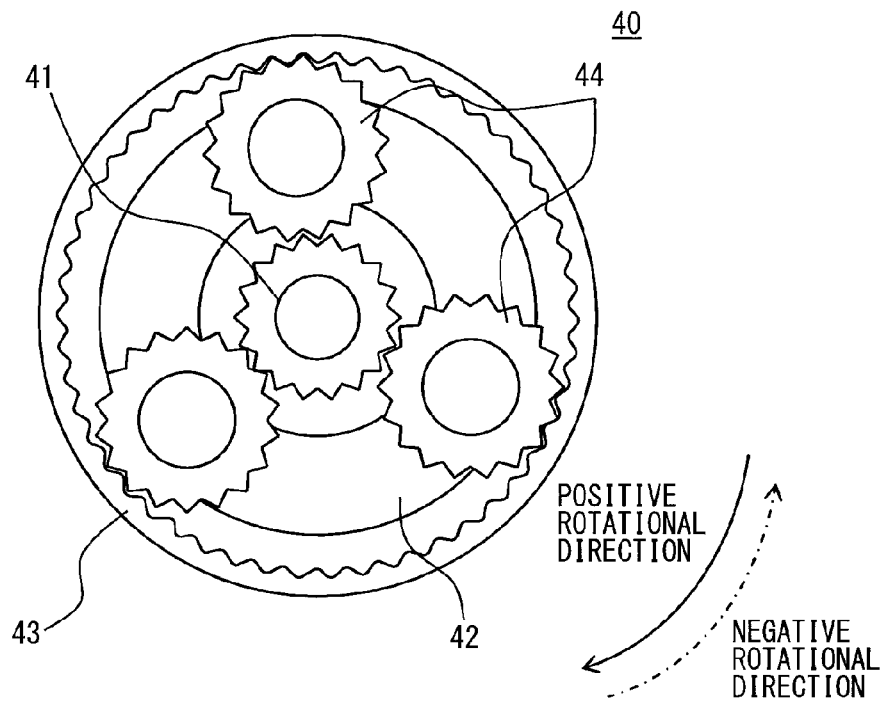
FIG. 2 is a schematic diagram showing a power distribution mechanism.

As shown in FIG. 2, the power distribution mechanism 40 includes a sun gear 41, the planetary carrier 42, a ring gear 43, and a pinion gear 44. The sun gear 41 and the pinion gear 44 are a disk shape, and have teeth on an outer peripheral surface. The ring gear 43 is a disk shape, and has teeth on an inner peripheral surface. The sun gear 41 is placed at a position that is a center of an area surrounded by the inner peripheral surface of the ring gear 43. The pinion gear 44 is interposed between the sun gear 41 and the ring gear 43. The sun gear 41, the pinion gear 44, and the ring gear 43 mesh with each other. When a torque is generated in one gear of the above gears to rotate the one gear, other gears of the above gears also rotate together with the one gear. As shown in FIG. 2, a direction indicated by a solid arrow is a positive rotational direction that is a clockwise rotational direction, and a direction indicated by a dashed arrow is a negative rotational direction that is a counterclockwise rotational direction.

The sun gear 41 is connected to the output shaft of the second MG 30, and the planetary carrier 42 is connected to the crank shaft of the engine 10. The ring gear 43 is connected to the output shaft of the first MG 20, and the pinion gear 44 is connected to the planetary carrier 42. When the output shaft of the first MG 20 rotates in the positive rotational direction in a case where the engine 10 is stopped, a positive torque is generated in the ring gear 43, and the ring gear 43 also rotates in the positive rotational direction. Then, the pinion gear 44 also rotates in the positive rotational direction according to a positive rotation of the ring gear 43, and the sun gear 41 rotates in the negative rotational direction. In this case, since no torque is generated in the sun gear 41, the pinion gear 44 only rotates in its axis, but not revolves around the sun gear 41. Further, the planetary carrier connected to the pinion gear 44 does not rotate. When the positive torque is generated in the output shaft of the second MG 30, a braking torque is generated in the sun gear 41. In this case, a negative rotation of the sun gear 41 is weakened, and a number difference between a rotational number of the sun gear 41 and the rotational number of the ring gear 43 is generated. The positive torque is generated in the pinion gear 44 according to the number difference, and then the pinion gear 44 starts to revolve around the sun gear 41. Further, the planetary carrier 42 connected to the pinion gear 44 also starts to rotate. Since the planetary carrier 42 is connected to the crank shaft, the crank shaft is cranked according to the rotation of the planetary carrier 42. When the rotation number of the crank shaft exceeds a predetermined number, the fuel is injected by the injector, a spark is generated by the plug, and the engine 10 is started.

When the positive torque is generated in the planetary carrier 42 according to a start of the engine 10 in a case where the braking torque is generated in the sun gear 41, the planetary carrier 42 rotates in the positive rotational direction, and the ring gear 43 and the sun gear 41 also rotate in the positive rotational direction. In this case, when the positive torque is generated in the ring gear 43, the motive power generated by the engine 10 and the first MG 20 is transmitted to the drive shaft 51. When the braking torque is generated in the sun gear 41, the second MG 30 executes the electric-power generation.

When the braking torque is generated in the ring gear 43 in a case where an accelerator pressing quantity becomes zero and the engine 10 is stopped, the first MG 20 executes the electric-power generation by utilizing the rotational energy of the wheel. The electric power generated by the first MG 20 is supplied to the power storage portion 70 through the inverter 60. In addition, the electric power generated by the second MG 30 is used to charge the power storage portion 70 or to generate the positive torque of the first MG 20.

The inverter 60 has a function that converts a direct-current electric power supplied from the power storage portion 70 into an alternating-current electric power, and a function that converts the alternating-current electric power supplied from the first MG 20 and the second MG 30 into the direct-current electric power. The inverter 60 includes plural transistor elements. Since the control portion 80 controls a drive of the transistor elements, a flowing direction of the current flowing through the stator coils is controlled, and the positive torque or the braking torque is generated in the first MG 20 and the second MG 30.

The power storage portion 70 that is a battery supplies the direct-current electric power to the inverter 60.

Figure 3:
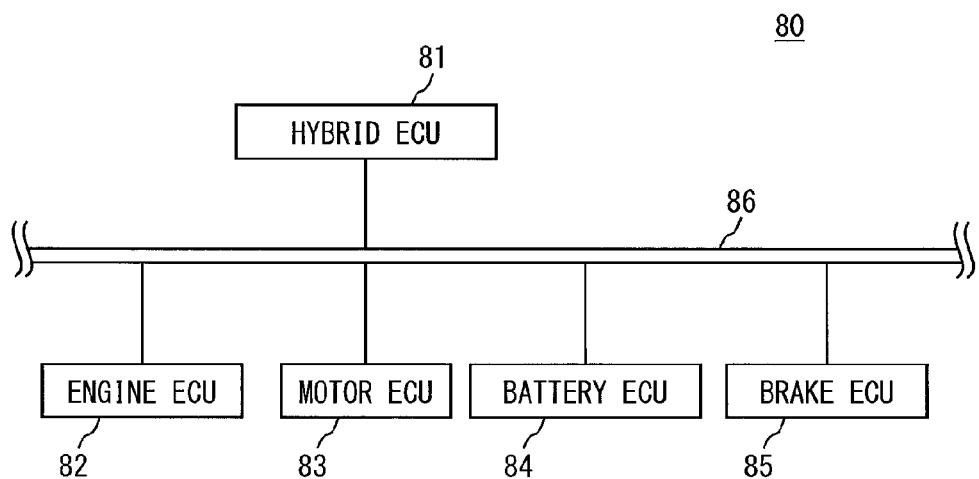
FIG. 3 is a block diagram showing a control portion.

The control portion 80 is a control system of the hybrid vehicle 100. As shown in FIG. 3, the control portion 80 includes a hybrid ECU 81, an engine ECU 82, a motor ECU 83, a battery ECU 84, a brake ECU 85, and a bus wiring 86. The hybrid ECU 81, the engine ECU 82, the motor ECU 83, the battery ECU 84, and the brake ECU 85 can send and receive signals to each other through the bus wiring 86.

The hybrid ECU 81 cooperative controls the engine 10, the first MG 20, and the second MG 30 to control a travelling of the hybrid vehicle 100. The hybrid ECU 81 calculates a torque and a rotational number which are necessary for the travelling, based on an accelerator opening degree or a battery charging capacity, and sends commands to the engine ECU 82 and the motor ECU 83. The engine ECU 82 and the motor ECU 83 control the rotational number and the torque of the engine 10, the first MG 20, and the second MG 30, and control a travelling state of the hybrid vehicle 100. The hybrid ECU 81 generates the regeneration-braking force to control a speed difference between a speed of an own vehicle and a speed of a front vehicle to be zero in a case where a speed-reduction request of a user is generated. According to the present embodiment, the speed-reduction request may be generated in a normal travelling of the own vehicle. When the speed difference is not zero, the hybrid ECU 81 sends an operation command of the hydraulic brake 53 to the brake ECU 85. The brake ECU 85 increases an oil pressure of the hydraulic brake 53 based on the operation command, and the braking force is generated in the hybrid vehicle 100.

As shown in FIG. 1, the sensing portion 90 includes an inter-vehicle sensor 91, an accelerator sensor 92, and a battery sensor 93. The inter-vehicle sensor 91 detects an inter-vehicle distance between the own vehicle and the front vehicle at a predetermined time. The front vehicle is a vehicle travelling in front of the own vehicle. The inter-vehicle sensor 91 is provided with a millimeter wave radar or a camera. The accelerator sensor 92 detects the accelerator pressing quantity generated by the user driving the own vehicle. The battery sensor 93 detects a battery state of the own vehicle including an available capacity of the power storage portion 70 and an electric quantity of the power storage portion 70 chargeable per unit time. The above sensor signals detected by the sensing portion 90 are transmitted to the control portion 80. According to the present embodiment, the hybrid ECU 81 calculates the speed difference based on the inter-vehicle distance. The hybrid ECU 81 calculates the speed difference based on a time variation of the inter-vehicle distance. When the inter-vehicle distance is shortened, the speed difference is a positive value. When the inter-vehicle distance is increased, the speed difference is a negative value. When the speed difference is a positive value, the own vehicle travels faster than the front vehicle. When the speed difference is a negative value, the own vehicle travels slower than the front vehicle. When the speed difference is zero, the speed of the own vehicle is equal to the speed of the front vehicle. When the speed difference is maintained to a positive value, the own vehicle is in a state approaching the front vehicle. When the speed difference is maintained to a negative value, the own vehicle is in a state separating from the front vehicle. When the speed difference is maintained to zero, the inter-vehicle distance is maintained to be constant. According to the present embodiment, the hybrid ECU 81 functions as a speed sensor. In addition, the sensing portion 90 includes a vehicle-speed sensor detecting a speed of the own vehicle, or a navigation system storing a tilted angle of a road surface gradient.

Figure 4:
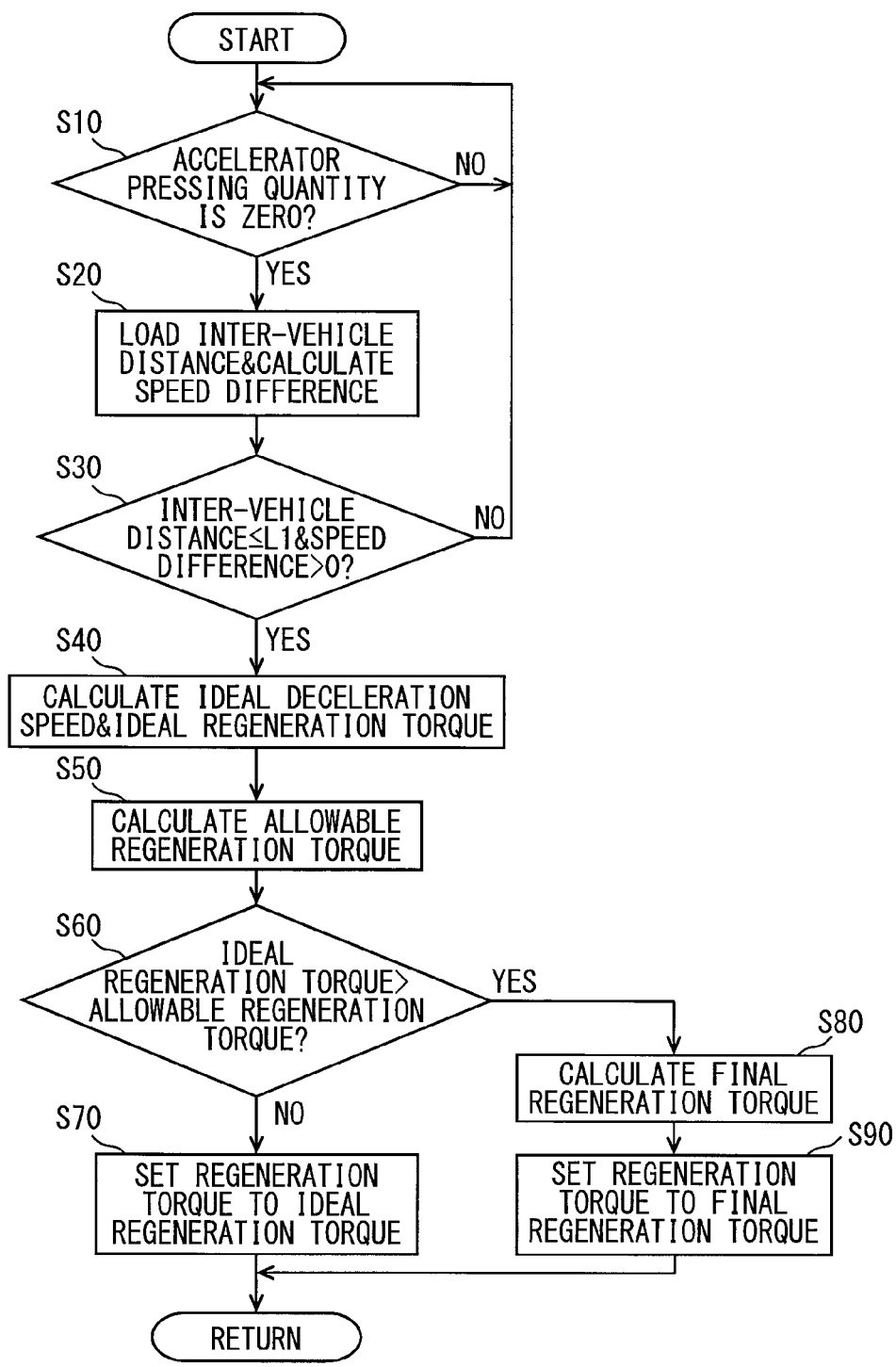
FIG. 4 is a flowchart showing a regeneration of a hybrid ECU of when a speed-reduction request is generated.

Referring to FIGS. 4 to 7, the regeneration of the hybrid ECU 81 of when the speed-reduction request is generated will be described. As shown in FIG. 4, at S10, the hybrid ECU 81 loads the accelerator pressing quantity from the accelerator sensor 92, and determines whether the accelerator pressing quantity is zero. In other words, the hybrid ECU 81 determines whether the user stops a pressing of the accelerator pedal and the speed-reduction request is generated. When the hybrid ECU 81 determines that the accelerator pressing quantity is zero and the speed-reduction request is generated, the hybrid ECU 81 proceeds to S20. When the hybrid ECU 81 determines that the accelerator pressing quantity is greater than zero, the hybrid ECU 81 repeatedly executes operations in S10. In other words, the hybrid ECU 81 waits until the speed-reduction request is generated.

At S20, the hybrid ECU 81 loads the inter-vehicle distance from the inter-vehicle sensor 91. Further, the hybrid ECU 81 calculates the speed difference based on the inter-vehicle distance. Then, the hybrid ECU 81 proceeds to S30.

At S30, the hybrid ECU 81 determines whether the inter-vehicle distance is no more than a speed-reduction distance L1 and the speed difference is a positive value. In other words, the hybrid ECU 81 determines whether the own vehicle is approaching the front vehicle and the inter-vehicle distance is no less than a distance necessary to increase a regeneration torque to generate the regeneration braking force. When the hybrid ECU 81 determines that the inter-vehicle distance is no more than the speed-reduction distance L1 and the speed difference is a positive value, the hybrid ECU 81 proceeds to S40. In this case, when the speed difference is a positive value, the own vehicle is in an approaching state. When the hybrid ECU 81 determines that the inter-vehicle distance is greater than the speed-reduction distance L1 or the speed difference is not a positive value, the hybrid ECU 81 returns to S10.

The speed-reduction distance L1 is established based on a distance where a human feels the speed of the own vehicle is necessary to be reduced when the own vehicle is approaching the front vehicle and starts to reduce the speed of the own vehicle. The speed-reduction distance L1 may be a fixed value, or may be a variable value that is changed based on the speed difference, the road surface gradient, or weather. Alternatively, since an approaching time of the own vehicle approaching the front vehicle is determined by the inter-vehicle distance and the speed difference, the speed-reduction distance L1 may be established according to the inter-vehicle distance and the speed difference. According to the present embodiment, the speed-reduction distance L1 is a first predetermined distance.

Figure 5:
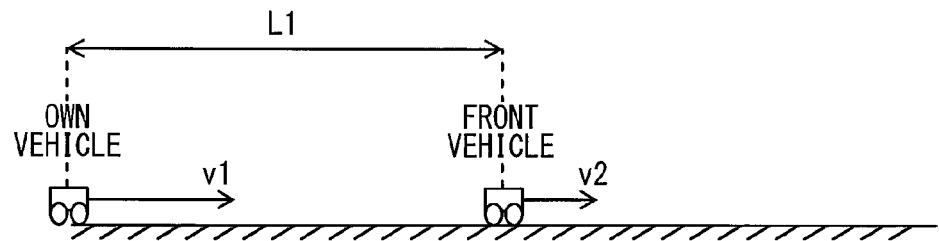
FIG. 5 is a schematic diagram showing a state that an inter-vehicle distance is a speed-reduction distance.
Figure 6:
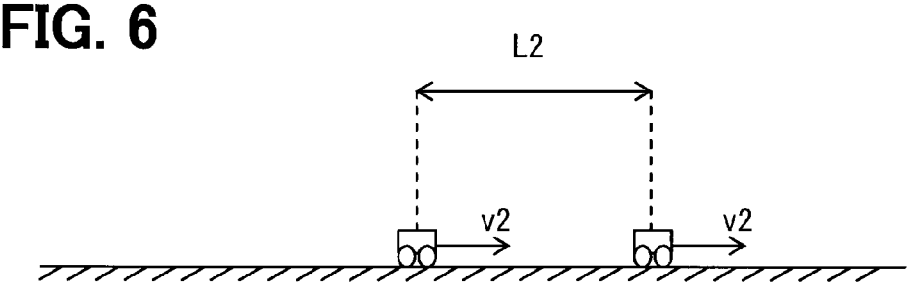
FIG. 6 is a schematic diagram showing a state that a speed difference becomes zero according to a generation of a regeneration-braking force and the inter-vehicle distance becomes a safe distance.
Figure 7:
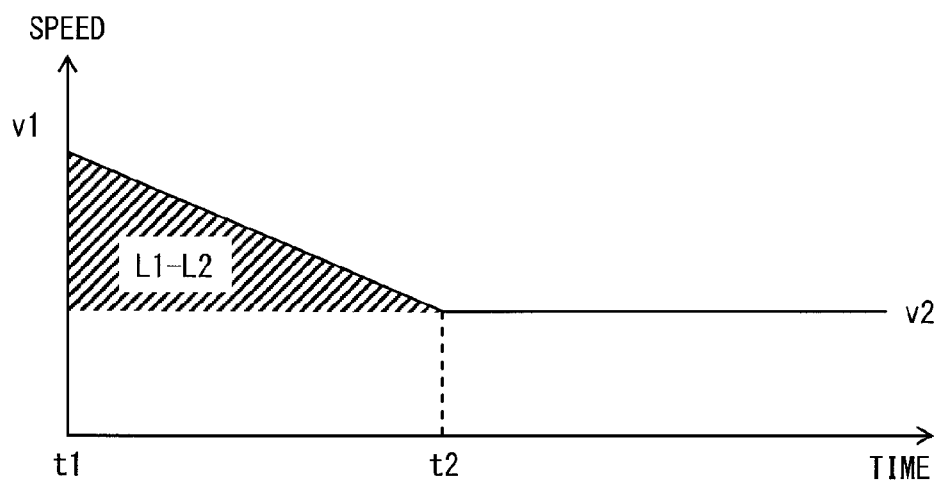
FIG. 7 is a graph showing a time variation of a vehicle speed generated according to an ideal regeneration torque.

At S40, the hybrid ECU 81 calculates an ideal deceleration speed that makes the speed difference become zero in a case where the inter-vehicle distance is changed from the speed-reduction distance L1 to a safe distance L2, and calculates an ideal regeneration torque to generate the ideal deceleration speed. As shown in FIG. 5, the speed of the own vehicle is expressed as v1, the speed of the front vehicle is expressed as v2 that is less than v1, and the inter-vehicle distance is the speed-reduction distance L1, at a time point t1. In this case, when the ideal regeneration torque is generated, the speed difference is gradually reduced as shown in FIG. 7. As shown in FIG. 6, the speed of the own vehicle becomes v2 that is equal to the speed of the front vehicle, and the speed difference becomes zero, and the inter-vehicle distance becomes the safe distance L2, at a time point t2. In other words, the speed of the own vehicle is gradually reduced from v1 to v2 in a time period from the time point t1 to the time point t2 where the own vehicle approaches the front vehicle by a distance (L1-L2). Then, the inter-vehicle distance is maintained to the safe distance L2, and a noticing to passengers of the own vehicle that a variation of a speed reduction generated by the regeneration braking force is suppressed. The speed reduction generated by the ideal regeneration torque is set to make a driveability optimum.

The ideal regeneration torque is greater than the regeneration torque of when the own vehicle is not in the approaching state. In other words, the ideal regeneration torque is greater than the regeneration torque of when the own vehicle is in a non-approaching state or is greater than the regeneration torque in S10 to S30. The ideal regeneration torque is calculated such that a vehicle speed variation is constant in a case where the inter-vehicle distance varies from L1 to L2 and the speed of the own vehicle varies from v1 to v2. In this case, the vehicle speed variation is a variation of the speed of the own vehicle. Since the speed of the own vehicle varies not only according to the regeneration torque but also according to the road surface gradient, a calculation of the ideal regeneration torque not only considers the speed difference and the inter-vehicle distance but also may consider the speed of the own vehicle and the road surface gradient. The safe distance L2 is a distance that the own vehicle can prevent from being collided with the front vehicle when the front vehicle is sharply decelerated and a pressing of the hydraulic brake 53 or a travelling operation is executed by the user to maintain a sufficient inter-vehicle distance. In other words, the safe distance L2 a distance sufficiently greater than the inter-vehicle distance that is necessary for a brake assist. The safe distance L2 may be a fixed value, or may be a variable value that is changed based on the speed difference, the road surface gradient, or weather. Alternatively, since the approaching time of the own vehicle approaching the front vehicle is determined by the inter-vehicle distance and the speed difference, the safe distance L2 may be established according to the inter-vehicle distance and the speed difference. According to the present embodiment, the safe distance L2 is a second predetermined distance.

At S50, the hybrid ECU 81 loads the available capacity of the power storage portion 70 and the electric quantity of the power storage portion 70 chargeable per unit time by utilizing the battery sensor 93. The hybrid ECU 81 stores an upper limit of the regeneration torque determined by the driveability, and calculates an allowable regeneration torque that is feasible in a current vehicle state, based on the available capacity of the power storage portion 70, the electric quantity of the power storage portion 70 chargeable per unit time, and the upper limit of the regeneration torque. The allowable regeneration torque is greater than the regeneration torque of when the own vehicle is in the non-approaching state. The hybrid ECU 81 proceeds to S60 after calculating the allowable regeneration torque.

At S60, the hybrid ECU 81 compares the ideal regeneration torque calculated at S40 with the allowable regeneration torque calculated at S50. In other words, the hybrid ECU 81 determines whether the ideal regeneration torque is greater than the allowable regeneration torque. When the hybrid ECU 81 determines that the ideal regeneration torque is less than or equal to the allowable regeneration torque, the hybrid ECU 81 determines that the regeneration torque can be set to the ideal regeneration torque, and proceeds to S70. When the hybrid ECU 81 determines that the ideal regeneration torque is greater than the allowable regeneration torque, the hybrid ECU 81 determines that the regeneration torque cannot be set to the ideal regeneration torque, and proceeds to S80.

At S70, the hybrid ECU 81 outputs a command to the motor ECU 83 to set the regeneration torque to the ideal regeneration torque. Then, the hybrid ECU 81 returns to S10 to execute the regeneration, and adjusts the regeneration torque at a predetermined time interval $\Delta t$.

At S80, the hybrid ECU 81 calculates a final regeneration torque that is closest to the ideal regeneration torque, based on the allowable regeneration torque. In other words, the hybrid ECU 81 calculates the final regeneration torque that makes the speed difference become close to zero at the safe distance L2 at the earliest stage and the driveability becomes highest, in the allowable regeneration torque. That is, the hybrid ECU 81 calculates the final regeneration torque that makes the speed difference become close to zero in a case where the inter-vehicle distance is changed to the safe distance L2, based on the allowable regeneration torque. The final regeneration torque is also calculated such that the vehicle speed variation is substantially constant in a case where the inter-vehicle distance varies from L1 to L2. Then, the hybrid ECU 81 proceeds to S90.

At S90, the hybrid ECU 81 outputs a command to the motor ECU 83 to set the regeneration torque to the final regeneration torque. Then, the hybrid ECU 81 returns to S10 to execute the regeneration, and adjusts the regeneration torque at the predetermined time interval $\Delta t$.

As the above description, the hybrid ECU 81 repeatedly executes operations from S10 to S90 at the predetermined time interval $\Delta t$ to adjust the regeneration torque. In other words, the hybrid ECU 81 executes operations to set the regeneration torque to the ideal regeneration torque or the final regeneration torque at the predetermined time interval $\Delta t$, until the inter-vehicle distance becomes the safe distance L2 and the speed difference becomes zero.

In addition, the hybrid ECU 81 continuously monitors the inter-vehicle distance and the speed difference in the regeneration. When the hybrid ECU 81 determines that the inter-vehicle distance is less than the safe distance L2 and the speed difference is a positive value in the regeneration where the speed of the own vehicle is reduced only by the regeneration braking force, the hybrid ECU 81 determines that it is necessary to generate the braking force by the hydraulic brake 53. In this case, the hybrid ECU 81 outputs a command to the brake ECU 85 to generate the braking force by the hydraulic brake 53. A condition that the braking force generated by the hydraulic brake 53 is necessary is assumed to be generated in a case where the speed of the front vehicle is sharply changed or the road surface gradient is sharply changed. In addition, since the speed difference is not zero at the safe distance L2 after the regeneration braking force is generated by the final regeneration torque, it is assumed that the braking force generated by the hydraulic brake 53 is necessary.

Next, effects of the hybrid vehicle 100 according to the present embodiment will be described. When the accelerator pressing quantity becomes zero, the hybrid ECU 81 determines that the speed-reduction request of the user is generated. When the hybrid ECU 81 determines that the own vehicle is in the approaching state where the own vehicle is approaching the front vehicle and the regeneration torque is necessary to be increased to generate the regeneration braking force, the hybrid ECU 81 sets the regeneration torque to the ideal regeneration torque or the final regeneration torque. Therefore, the hybrid ECU 81 increases the regeneration torque to be greater than the regeneration torque of when the own vehicle is in the approaching state, so as to generate the regeneration braking force. Thus, the approaching of the own vehicle toward the front vehicle can be suppressed according to the speed-reduction request of the user, and the electric-power generation can be efficiently executed according to the regeneration braking force generated by increasing the regeneration torque.

The ideal regeneration torque and the final regeneration torque are set such that the vehicle speed variation is substantially constant. Therefore, it is suppressed that the vehicle speed is sharply changed due to a generation of the regeneration braking force. In other words, it is suppressed that a variation of an acceleration generated according to the regeneration braking force is noticed to passengers of the own vehicle.

The regeneration torque is adjusted at the predetermined time interval. Therefore, the ideal regeneration torque or the final regeneration torque can be set according to a battery state of the own vehicle, a speed variation of the front vehicle, or a gradient variation of the road surface gradient.

When the hybrid ECU 81 determines that the inter-vehicle distance is less than the safe distance L2 and the speed difference is a positive value in the regeneration where the speed of the own vehicle is reduced only by the regeneration braking force, the hybrid ECU 81 outputs a command to the brake ECU 85 to generate the braking force by the hydraulic brake 53. Therefore, when the inter-vehicle distance is less than the safe distance L2, it is suppressed that the own vehicle approaches the front vehicle.

The present disclosure is not limited to the embodiments mentioned above, and can be applied to various embodiments within the spirit and scope of the present disclosure.

Figure 8:
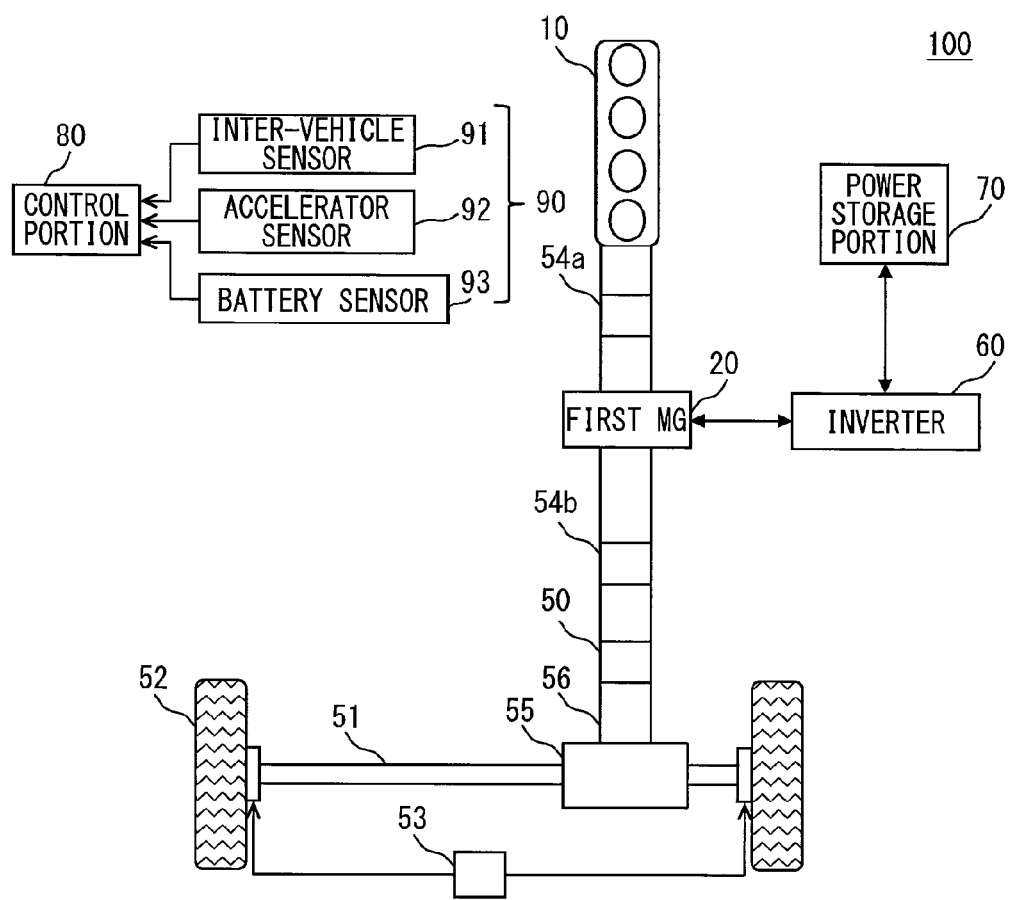
FIG. 8 is a block diagram showing a modification example of the hybrid vehicle.

According to the present embodiment, the hybrid vehicle 100 includes the first MG 20, the second MG 30, and the power distribution mechanism 40. However, the hybrid vehicle 100 is not limited. As shown in FIG. 8, the hybrid vehicle 100 may only include the first MG 20 without including the second MG 30 and the power distribution mechanism 40. As shown in FIG. 8, in the hybrid vehicle 100, a power transmission shaft 56 is connected to the drive shaft 51 through a differential gear 55, and the speed reducer 50 is arranged at the power transmission shaft 56. The power transmission shaft 56 is provided with the engine 10, the first MG 20, a first clutch 54a, and a second clutch 54b. The first clutch 54a is interposed between the engine 10 and the first MG 20, and the second clutch 54b is interposed between the first MG 20 and the speed reducer 50. Thus, a power transmission level from the engine 10 to the power transmission shaft 56 is adjusted by the first clutch 54a, and a power transmission level from the engine 10 and the first MG 20 to the speed reducer 50 is adjusted by the second clutch 54b.

In a modification example of the hybrid vehicle 100 as shown in FIG. 8, when the accelerator pressing quantity becomes zero, a connection state between the engine 10 and the power transmission shaft 56 is interrupted by the first clutch 54a. When the own vehicle is in the approaching state where the own vehicle is approaching the front vehicle and the regeneration torque is necessary to be increased to generate the regeneration braking force, the first MG 20 generates the regeneration braking force. When the connection state between the engine 10 and the power transmission shaft 56 is interrupted by the first clutch 54a, a combustion in the engine 10 may be terminated to save energy such that the engine 10 is in a non-drive state.

In another modification example of the hybrid vehicle 100, the first clutch 54a is cancelled from a configuration shown in FIG. 8. In this case, when the accelerator pressing quantity becomes zero and the own vehicle is in the approaching state, the speed of the own vehicle is reduced by the engine 10, and the regeneration braking force is generated by the first MG 20.

According to the present embodiment, in the hybrid vehicle 100, the regeneration braking force is generated by a motor such as the first MG 20. However, other vehicles in which a motor generates the regeneration braking force may be used. Specifically, the regeneration braking force may be generated by a motor in a gasoline vehicle or an electric vehicle. In other words, the motor controller according to the present embodiment may be applied to any vehicles in which a motor can generate the regeneration braking force.

According to the present embodiment, both the first motor generator 20 and the second motor generator 30 have a rotor including a permanent magnet. However, the rotor may include a coil generating a magnetic flux instead of the permanent magnet. Alternatively, the rotor may include both the coil generating a magnetic flux and the permanent magnet.

According to the present embodiment, the control portion 80 includes the hybrid ECU 81, the engine ECU 82, the motor ECU 83, the battery ECU 84, and the brake ECU 85. However, a configuration that the hybrid ECU 81 functions as the engine ECU 82 or a configuration that the hybrid ECU 81 functions as the motor ECU 83 may be used. In other words, the engine ECU 82 or the motor ECU 83 may be cancelled.

According to the present embodiment, the hybrid ECU 81 executes the regeneration shown in FIG. 4 of when a speed-reduction request is generated. However, the brake ECU 85 may execute the regeneration shown in FIG. 4 of when a speed-reduction request is generated.

According to the present embodiment, the hybrid ECU 81 calculates the speed difference between the speed of the own vehicle and the speed of the front vehicle based on the inter-vehicle distance detected at the predetermined time. However, an inter-vehicle communication may be used to detect the speed difference. In this case, the own vehicle and the front vehicle notice the speed and the torque to each other, and the hybrid ECU 81 calculates the speed difference based on the speed and the torque which are received.

According to the present embodiment, when the accelerator pressing quantity becomes zero, it is determined that the speed-reduction request of the user is generated. However, a value determining whether the speed-reduction request of the user is generated is not limited to zero, and a finite value may be used. In this case, at S10 shown in FIG. 4, when the hybrid ECU 81 determines that the accelerator pressing quantity is no more than the finite value, the hybrid ECU 81 proceeds to S20. The finite value is a predetermined pressing quantity, and a condition that the accelerator pressing quantity is less than or equal to the finite value includes a condition that the accelerator pressing quantity becomes zero.

According to the present embodiment, when the inter-vehicle distance is no more than the speed-reduction distance L1 and when the speed difference is a positive value, it is determined that the own vehicle is in the approaching state where the own vehicle is approaching the front vehicle and the regeneration torque is necessary to be increased to generate the regeneration braking force. However, a reference value of the speed difference is not limited to be a positive value. Specifically, the reference value may be a predetermined value that is finite and positive. In this case, at S30 shown in FIG. 4, when the hybrid ECU 81 determines that the inter-vehicle distance is no more than the speed-reduction distance L1 and the speed difference is greater than the predetermined value that is finite and positive, the hybrid ECU 81 determines that the own vehicle is in the approaching state and proceeds to S40. The predetermined value that is finite and positive, and zero are referred to as a predetermined speed.

While the present disclosure has been described with reference to the embodiments thereof, it is to be understood that the disclosure is not limited to the embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A motor controller controlling a motor mounted to a vehicle, the motor controller comprising:
    an inter-vehicle sensor detecting an inter-vehicle distance between an own vehicle and a front vehicle that is travelling in front of the own vehicle;
    a speed sensor detecting a speed difference between a speed of the own vehicle and a speed of the front vehicle;
    an accelerator sensor detecting an accelerator pressing quantity generated by a user driving the own vehicle; and
    a control portion controlling a regeneration torque of the motor based on the inter-vehicle distance, the speed difference, and the accelerator pressing quantity, wherein
    when the control portion determines that the accelerator pressing quantity is less than or equal to a predetermined pressing quantity, the control portion determines that a speed-reduction request is generated by the user, and
    when the control portion determines that the inter-vehicle distance is no more than a first predetermined distance and when the own vehicle is in an approaching state where the speed difference is greater than a predetermined speed, the control portion increases the regeneration torque of the motor to be greater than the regeneration torque of when the inter-vehicle distance is greater than the first predetermined distance or when the own vehicle is in a non-approaching state where the speed difference is no more than the predetermined speed, so as to generate a regeneration braking force.

2. The motor controller according to claim 1, wherein when the own vehicle is in the approaching state, the control portion calculates an ideal regeneration torque that makes the speed difference become zero in a case where the inter-vehicle distance is changed to a second predetermined distance shorter than the first predetermined distance, and sets the regeneration torque of the motor to the ideal regeneration torque.

3. The motor controller according to claim 2, further comprising:
    a battery sensor detecting a battery state of the own vehicle, wherein the control portion
        calculates an allowable regeneration torque that is feasible and the ideal regeneration torque at a first predetermined time interval, based on the battery state and an upper limit of the regeneration torque determined by the driveability, and
        compares the ideal regeneration torque and the allowable regeneration torque at the first predetermined time interval, and
    when the control portion determines that the ideal regeneration torque is less than or equal to the allowable regeneration torque, the control portion sets the regeneration torque of the motor to the ideal regeneration torque.

4. The motor controller according to claim 3, wherein when the control portion determines that the ideal regeneration torque is greater than the allowable regeneration torque, the control portion calculates a final regeneration torque that makes the speed difference become close to zero in a case where the inter-vehicle distance is changed to the second predetermined distance, based on the allowable regeneration torque, and sets the regeneration torque of the motor to the final regeneration torque.

5. The motor controller according to claim 2, wherein when the control portion determines that the inter-vehicle distance is less than the second predetermined distance and the speed difference is a positive value in a case where the speed of the own vehicle is reduced only by the regeneration braking force, the control portion generates a braking force by utilizing a hydraulic brake.

6. The motor controller according to claim 1, wherein the inter-vehicle sensor includes a millimeter wave radar or a camera.

7. The motor controller according to claim 6, wherein the inter-vehicle sensor detects the inter-vehicle distance at a second predetermined time interval, and the speed sensor detects the speed difference based on the inter-vehicle distance detected at the second predetermined time interval.

* * * * *